Figure 4:
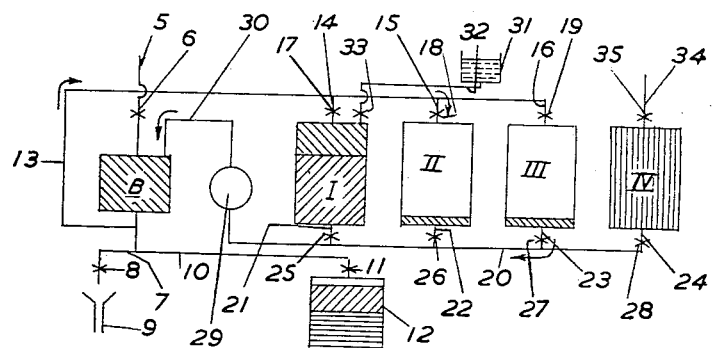

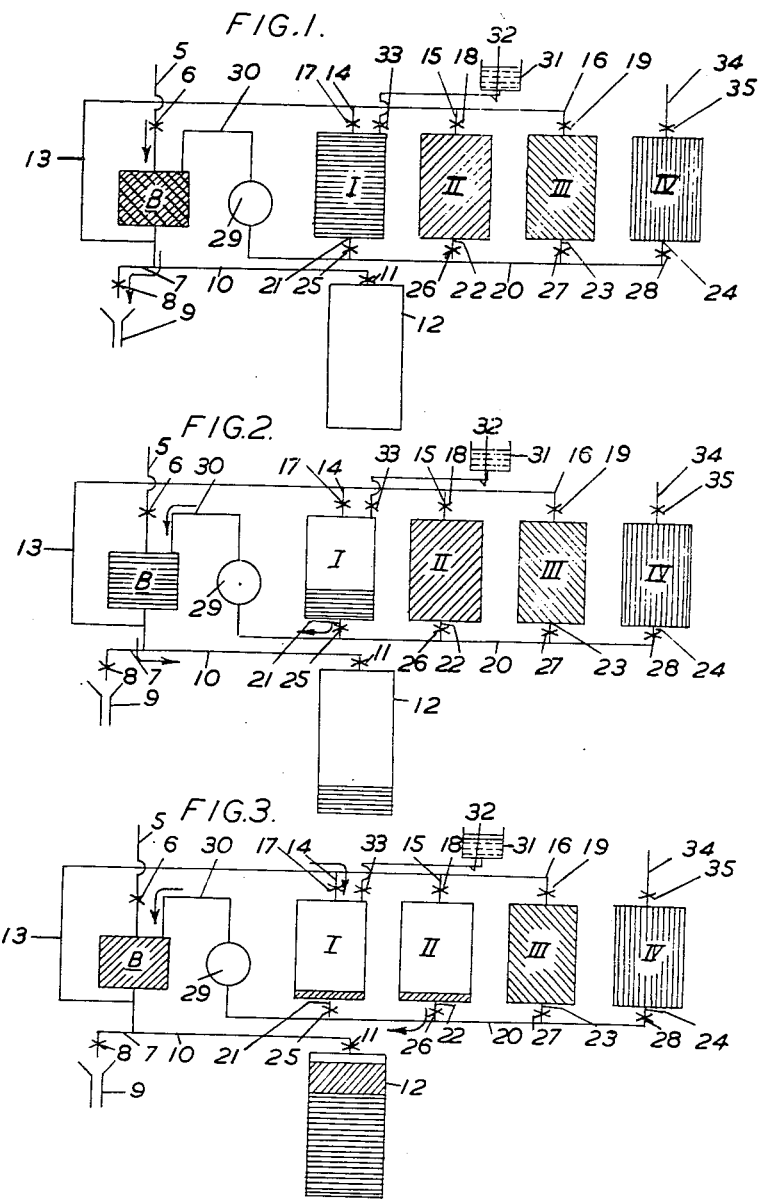

July 10, 1956　　　　　E. I. AKEROYD　　　　2,754,261
REGENERATION OF ION-EXCHANGE MATERIAL
Filed April 4, 1952　　　　　　　　　　　　　2 Sheets-Sheet 2

Inventor
EWART INGHAM AKEROYD
By
Bailey, Stephens & Huettig
Attorneys

United States Patent Office 2,754,261
Patented July 10, 1956

2,754,261

REGENERATION OF ION-EXCHANGE MATERIAL

Ewart Ingham Akeroyd, London, England, assignor to The Permutit Company Limited, London, England, Stewarts & Lloyds Limited, Glasgow, Scotland, and The Woodall-Duckham Vertical Retort and Oven Construction Company (1920) Limited, London, England Application April 4, 1952, Serial No. 280,631

Claims priority, application Great Britain April 12, 1951

1 Claim. (Cl. 210—24)

This invention relates to the regeneration of ion-exchange materials.

Ion-exchange materials are commonly used for the removal of ions from water and other liquids, and in practice the liquid to be treated is passed through a bed of the exchange material. An ion-exchange material must, of course, be regenerated when the ions which should be taken up by it appear in the effluent liquid or the quantity of them in the effluent exceeds a predetermined figure. At the end of the regenerating step it is the common practice to wash the material so as to remove excess regenerant and any products of regeneration that may be present, i. e. compounds containing the ions taken up from the original liquor and in turn displaced by the regenerant. In order to economise in regenerant, part of the effluent washing water may be used again, and in particular may constitute the regenerating solution used for initial regeneration either of the same material in the next regeneration cycle or of another material. In the known processes in which a regenerant is used twice in this way the solution is discarded after being used the second time. i. e. is run to waste.

Now although in most ion-exchange processes the object is to free the original liquid from ions present in it, and during the regeneration step the effluent liquor is run to waste either immediately or after being re-used, ion-exchange materials can be used in the recovery of small quantities of valuable materials from solutions and also in the removal of small quantities of obnoxious materials from solutions, such for example as industrial effluent liquors. In either case it is important to obtain a final liquid containing the valuable or obnoxious material in as high a concentration as possible, since in the former case a high concentration facilitates the subsequent recovery of the valuable material, and in the latter case it facilitates the disposal of the obnoxious material. The invention is concerned with such processes for concentrating valuable or obnoxious ions by passing the solution containing them through a bed of ion-exchange material, displacing the ions taken up from the bed by regenerant, collecting the displaced liquid, washing the bed, and passing further solution through the bed.

An object of this invention is to provide an improved method of utilising washing water in the regeneration of ion-exchange materials.

Another object is so to regenerate and wash an ion-exchange material used for the removal of valuable or obnoxious ions from a liquor that the only liquid run to waste is that from which the valuable or obnoxious ions have been removed.

In this invention all the effluent regenerant and washing water, except an initial fraction which constitutes the collected liquid, is saved to serve as the regenerant and the first part of the washing water in the next cycle; fresh regenerant is added to that part of the saved liquid which is first passed through the bed in the next cycle; and the last part of the washing water is fresh water substantially equal in volume to the volume of liquid collected. As a result, the only liquid run to waste is that from which the valuable or obnoxious ions have been removed and the concentration of those ions in the collected solution is high in relation to that in the solution under treatment.

It will be understood that the washing water, in flowing through the bed for washing purposes picks up regenerant not used up in the process of regeneration and so becomes a dilute regenerating solution. It also picks up some valuable or obnoxious ions at each passage through the bed and so already contains a substantial quantity of these ions when fresh regenerant is added to it.

In the steps of regeneration and washing, the liquid may flow through the bed in the same direction as, or the opposite direction to, that in which the liquor under treatment flows during the working stage.

In carrying out the invention the process preferably comprises running to waste the liquid displaced from the bed by the initial regenerating liquid, then diverting the effluent containing obnoxious or valuable ions in a concentration high in relation to that in the solution under treatment and collecting this effluent for disposal or recovery, again diverting the effluent upon the concentration of obnoxious or valuable ions falling and delivering it to a tank for use as regenerant in the next regeneration cycle and similarly diverting the remainder of the effluent during the regeneration and washing to at least one further tank for re-use, and in the next cycle first adding regenerant to the first tank and using the contents as the first regenerating liquid, then using the contents of the remaining tank or tanks as regenerating and washing liquid and finally passing clean washing water through the bed.

There may advantageously be four tanks for washing water and connections by which the contents of each can be successively pumped into a bed of ion-exchange material which, during the working stage of each complete cycle, is used to remove valuable or obnoxious ions from a liquid. There are also connections by which the liquid driven out of the bed as a result of pumping the contents of a tank into the bed may be delivered either to one of the tanks or to a collecting tank or the like for further treatment (if it contains valuable ions) or for disposal (if it contains obnoxious ions).

The operation of a plant with four tanks will now be described with reference to the accompanying drawings, in which the figures are all diagrams showing different stages in the operation.

A single ion-exchange bed is shown at B and the four tanks are numbered I, II, III and IV. Liquor to be treated is introduced to the bed under pressure through a pipe 5 controlled by a valve 6. The effluent from the bed B can flow through a pipe 7 controlled by a valve 8 to a drain 9; or through a pipe 10 controlled by a valve 11 to a recovery or disposal tank 12; or through a pipe 13 to branch pipes 14, 15 and 16, respectively controlled by valves 17, 18 and 19 and leading to the tanks I, II and III. All four tanks are connected to a pipe 20 through, respectively, pipes 21, 22, 23 and 24 controlled by valves 25, 26, 27 and 28. The pipe 20 leads to a pump 29 by which the contents of any of the tanks can be forced through a pipe 30 to the bed B.

Regenerant can be supplied to the tank I from a container 31 through a pipe 32 controlled by a valve 33, and water can be supplied to the tank IV from a main 34 controlled by a valve 35.

In all the figures all the valves are closed except for those stated to be opened.

Figure 1 shows the position just at the end of a service run, i. e. liquor is being treated and the appearance in the effluent of the ions which are to be recovered or collected for disposal shows that the bed B needs regeneration. During this service run the valves 6 and 8 are open, the effluent liquor being discharged to waste.

The first step in the regeneration consists in pumping the contents of the tank I as regenerant through the bed B, the valve 25 being opened. The liquid in the bed is displaced and run to waste through the pipe 7, the valve 8 being open, in the same way as the effluent during the ordinary working run, since it is, of course, treated liquid deprived of substantially all the valuable or obnoxious ions. Alternatively, if the process is being carried out to recover valuable ions, this treated liquid may be added to the liquor to be treated in the next cycle. When the liquid which was in the bed at the start of the regeneration has been displaced, regenerant liquor emerges containing a high proportion of valuable or obnoxious ions. The valve 8 is shut and the valve 11 opened, so that this liquor is collected in the tank 12 for disposal or recovery. Figure 2 shows the plant as the tank I is nearly empty. The liquid originally in the bed, and indicated by double cross-hatching in Figure 1, has disappeared down the drain 9. Some of the contents of the tank I, indicated by horizontal hatching, are in the tank 12 and some in the bed, the remainder still being in the tank I.

Figure 5:
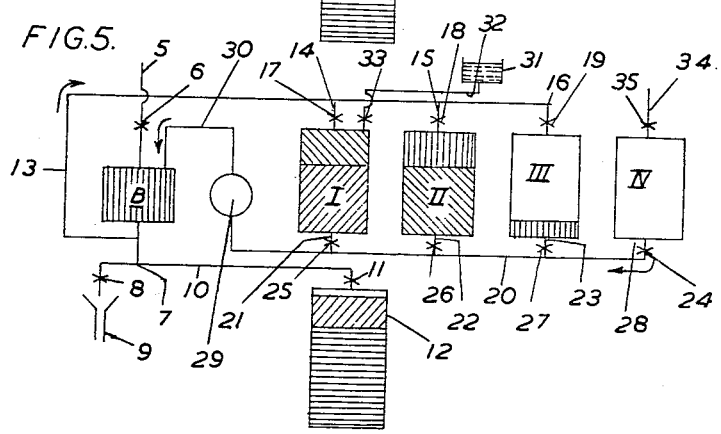

When the tank I has been emptied, the valve 25 is shut and the valve 26 opened so that the contents of the tank II (indicated by diagonal hatching from right to left) are pumped to the bed B. As this flow continues the concentration of the valuable or obnoxious ions in the effluent drops. The volume of effluent delivered to the collecting tank 12 for disposal or recovery will vary in accordance with the nature of the liquor being treated. In any case, when the concentration of valuable or obnoxious ions in the effluent from the bed falls to some predetermined figure, the liquid leaving the bed is diverted from the collecting tank 12 and passed back to the tank I, the valve 11 being shut and the valve 17 opened. For the purpose of illustration it is assumed that this occurs when one third of the contents of the tank II together with the whole of the contents of the tank II together with the whole of the contents of the tank I have been collected in the tank 12. When the tank II is almost empty the bed B will contain part of the liquid from the tank II, the tank I receiving the liquid being displaced from the bed. This is illustrated in Figure 3. When the tank II is empty, the valve 26 is closed and the valve 27 opened and the contents of the tank III (illustrated by diagonal cross-hatching from left to right) are pumped through the bed B to the tank I. When the tank I is full, the valve 17 is closed and the valve 18 opened, the position just before the tank III empties being shown in Figure 4. When the tank III is empty the valve 27 is closed and the valve 28 opened, so that clean water from the tank IV is pumped through the bed to fill the tank II; the valve 18 being closed and the valve 19 being opened when the tank II is full so that the tank III is partially filled. The position as the tank IV empties is shown in Figure 5. It will be seen that the first two tanks I and II are full, the tank III is two thirds full, and the tank IV is empty. The valve 6 is opened after closing the valve 28, and the liquor to be treated passed into the bed B through the pipe 5, the liquid displaced passing to the tank III until it is full and then the valve 19 is closed, the valve 8 opened and the effluent run to the drain 9, so that the directions of flows are as indicated in Figure 1.

The tank IV is then filled with fresh water and regenerant is added to the tank I from the container 31 to bring the concentration of the liquid in that tank up to the optimum for a fresh regenerating solution.

When the process is carried on in the way just described most of the liquid in the tank I is a solution that has three times passed through the bed during the regeneration step and so contains a high proportion of the valuable or obnoxious ions. Before the regenerant is added to it its regenerant content is low, but by increasing this content to the optimum it is possible to ensure that when the solution is used as the initial regenerant in the next cycle a very large proportion of the valuable or obnoxious ions taken up by the bed will be recovered in this solution, so that the latter will have a small volume and a high concentration. In consequence it is easier either to recover valuable ions from it or to dispose of it than in the processes used hitherto.

At the beginning of each regeneration step the tank II will contain a solution most of which has been used twice for regenerating, but in which the proportion of the valuable or obnoxious ions is lower than in the tank I. In the liquid in the tank III the proportion will be lower still.

There is no limit to the number of tanks which may be used, but the four tanks described constitute a convenient practical arrangement.

As an example, the process of the invention was used in the removal of thiocyanates and thiosulphates from a gasworks liquor. This liquor was passed through anion-exchange material by means of which all the thiocyanate and thiosulphate were removed so that the effluent was free from these. On the appearance of thiocyanate in the effluent, indicating exhaustion of the ion-exchange material, the flow of liquor was stopped and regeneration was carried on in the manner described above. The regenerant used was ammonia and the regenerating solution first used, i. e. the solution in the first tank, contained

|  | Percent |
|---|---|
| Ammonia | 11.73 |
| CNS | 0.027 |

After this had passed through the ion-exchange material its ammonia content had fallen to 8% and its thiocyanate content risen to 0.53%, and it was suitable for disposal. The contents of the second, third and fourth tanks were initially as follows:

|  | Percent |
|---|---|
| Tank II— |  |
| Ammonia | 0.036 |
| CNS | 0.01 |
| Tank III— |  |
| Ammonia | 0.08 |
| CNS | 0.005 |
| Tank IV—Water. |  |

At the end of the regeneration the contents of the tanks were as follows:

|  | Percent |
|---|---|
| Tank I— |  |
| Ammonia | 6.0 |
| CNS | 0.058 |
| Tank II— |  |
| Ammonia | 0.36 |
| CNS | 0.012 |
| Tank III— |  |
| Ammonia | 0.08 |
| CNS | 0.005 |
| Tank IV—Empty. |  |

After adjustment of the ammonia content in the tank I to a concentration of about 12%, and after filling the tank IV with clean water, the system was ready for use in the next regenerating cycle.

It will be seen from this example that the final liquor for treatment or disposal contains a substantial quantity of regenerant. If, as in the example, this is volatile, it may advantageously be recovered by distillation with or without the addition of some appropriate chemical substance for reaction. For example, the ammonia may be recovered by the addition of an alkali followed by distillation. If the process is applied to a hydrogen-ion regeneration in which hydrochloric acid is used as the regenerant, free acid may be directly recovered by distillation.

I claim:

A process for the recovery of obnoxious or valuable ions from an aqueous solution which comprises passing the solution through a bed of ion exchange material which takes up such ions, thereafter passing through the bed a series of solutions of decreasing concentration of regenerant to displace the ions taken up by such bed and to regenerate said bed and finally passing fresh wash water through said bed, the first of said regenerant containing solutions being made up of a solution containing regenerant washed out of said bed in a previous regenerating cycle and fresh regenerant, and the remaining solutions being solutions previously passed through such bed in a previous regenerating cycle and containing only regenerant washed out of the bed, collecting the effluent containing the displaced ions for disposal or recovery of the displaced ions while the displaced ion concentration of such effluent is high in relation to that in the original solution under treatment, and saving all of the remaining effluent from the regenerant containing solutions and wash water for use in a next regenerating cycle.

References Cited in the file of this patent

UNITED STATES PATENTS

| | | |
|---|---|---|
| 1,485,334 | Kriegsheim | Feb. 26, 1924 |
| 1,510,469 | Duggan | Oct. 7, 1924 |
| 1,947,248 | Burks | Feb. 13, 1934 |
| 2,157,511 | Urbain | May 9, 1939 |
| 2,599,558 | Juda | June 10, 1952 |
| 2,631,127 | D'Aldio | Mar. 10, 1953 |
| 2,664,396 | Riley | Dec. 29, 1953 |

FOREIGN PATENTS

| | | |
|---|---|---|
| 116,956 | Australia | May 20, 1943 |
| 592,767 | Great Britain | Sept. 29, 1947 |